(12) United States Patent
Glitho et al.

(10) Patent No.: US 6,233,449 B1
(45) Date of Patent: May 15, 2001

(54) OPERATION AND MAINTENANCE CONTROL POINT AND METHOD OF MANAGING A SELF-ENGINEERING TELECOMMUNICATIONS NETWORK

(75) Inventors: Roch Glitho, Montreal (CA); Bo Svensson, Huntington, NY (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/138,719

(22) Filed: Aug. 24, 1998

(51) Int. Cl.[7] .................................................. H04Q 7/20
(52) U.S. Cl. ........................ 455/423; 455/560; 455/67.1
(58) Field of Search ..................................... 455/446, 453, 455/422, 423, 424, 445, 501, 560, 67.1

(56) References Cited

U.S. PATENT DOCUMENTS

| | | | |
|---|---|---|---|
| 5,285,494 | * | 2/1994 | Sprecher et al. ...................... 455/423 |
| 5,297,193 | * | 3/1994 | Bouix et al. .......................... 455/423 |
| 5,408,218 | * | 4/1995 | Svedberg et al. ................. 340/825.16 |
| 5,726,979 | * | 3/1998 | Henderson et al. .................. 370/254 |
| 5,845,062 | * | 12/1998 | Branton et al. ....................... 370/241 |
| 5,870,676 | * | 2/1999 | Durvasula et al. ................... 455/450 |
| 6,012,152 | * | 1/2000 | Douik et al. ........................... 714/26 |

* cited by examiner

Primary Examiner—William G. Trost
Assistant Examiner—Tilahun Gesesse
(74) Attorney, Agent, or Firm—Smith, Danamraj & Youst, P.C.

(57) ABSTRACT

An operation and maintenance control point (OMCP) operates at an intermediate level in a telecommunications network between the network elements and the network management system (NMS). The OMCP reduces the processing load on the NMS, and rather than reporting symptoms, provides the NMS with suggested corrective actions to correct reported problems. The NMS executes the suggested corrective actions and compares the actual results in the network with predicted results. Feedback on the results is then provided to the OMCP to improve its analysis and provide more effective corrective actions are suggested if the problem recurs. By automatically interfacing with the NMS, which analyzes and executes the suggested corrective actions, the OMCP creates a self-engineering telecommunications network.

13 Claims, 5 Drawing Sheets

OPERATION AND MAINTENANCE CONTROL POINT AND METHOD OF MANAGING A SELF-ENGINEERING TELECOMMUNICATIONS NETWORK

BACKGROUND OF THE INVENTION

1. Technical Field of the Invention

This invention relates to telecommunication systems and, more particularly, to a self-engineering telecommunications network which includes an operation and maintenance control point.

2. Description of Related Art

Existing telecommunications networks interface with a Network Management System (NMS) which oversees the operation and maintenance of the network. The NMS communicates with different network elements (NEs) in the network. The NEs send reports to the NMS indicating the performance of the reporting NE. When a fault occurs in a NE, the NE sends an alarm and the fault symptoms to the NMS. However, the reported symptoms are often not enough to enable efficient management of the network. In addition, the NMS is centralized with many NEs reporting to the NMS. The processing load is too great for the NMS to efficiently analyze the reported symptoms and determine the root causes of the problems.

There are no known prior art teachings of a solution to the aforementioned deficiency and shortcoming such as that disclosed herein. It would be advantageous to have an operation and maintenance control point which operates at an intermediate level in the network between the NEs and the NMS. Such a device would reduce the processing load on the NMS and rather than reporting symptoms, would provide the NMS with suggested corrective actions to correct reported problems. By automatically interfacing with the NMS, which analyzes and executes the suggested corrective actions, the operation and maintenance control point would create a self-engineering telecomnnunications network.

SUMMARY OF THE INVENTION

In one aspect, the present invention is an operation and maintenance control point (OMCP) in a telecommunications network having a plurality of network elements that report to the OMCP and a network management system (NMS) to which the OMCP reports. The OMCP comprises a performance monitoring function that monitors performance of the network elements and determines quality of service (QoS) in the network, a trouble sniffer that receives performance and QoS data from the performance monitoring function and detects faults within the network, and an action proposal agent that receives performance and QoS data from the performance monitoring function and fault data from the trouble sniffer, and provides suggested corrective actions to the NMS.

In another aspect, the present invention is a self-engineering telecommunications network comprising a plurality of network elements (NEs), an operation and maintenance control point (OMCP) that receives preprocessed data from the NEs and determines suggested corrective actions, and a network management system (NMS) that receives the suggested corrective actions from the OMCP and executes them. Each of the NEs includes means for collecting raw traffic data and exchange data, and means for preprocessing the raw data. The OMCP includes a performance monitoring function that monitors performance of the NEs and determines quality of service (QoS) in the network, a trouble sniffer that receives performance and QoS data from the performance monitoring function and detects faults within the network, and an action proposal agent that receives performance and QoS data from the performance monitoring function and fault data from the trouble sniffer, and determines suggested corrective actions. The NMS includes means for predicting results within the network of executing the suggested corrective actions, means for executing the suggested corrective actions, means for determining the actual results of executing the suggested corrective actions, and means for providing feedback to the action proposal agent regarding the actual results. The action proposal agent then utilizes the feedback to provide better suggested corrective actions.

In another aspect, the present invention is a method of implementing a self-engineering telecommunications network. The method begins by automatically collecting information about the network's performance, detecting problems with the network's performance utilizing the collected information, and analyzing possible causes of the detected problems. The method continues by automatically determining suggested corrective actions to correct the causes, predicting results of executing the suggested actions, and executing the actions. This is followed by automatically comparing actual results of executing the suggested actions with the predicted results, and learning from the comparing step so that improved corrective actions are suggested when problems recur.

In yet another aspect, the present invention is a method of performing traffic load sharing between the cells of a self-engineering cellular radio telecommunications network. The network includes a mobile switching center (MSC) and a plurality of radio base stations serving a plurality of cells. The method comprises the steps of collecting by the MSC, traffic measurements from all the cells in the service area of the MSC, sending the traffic measurements to an operation and maintenance control point (OMCP), determining in the OMCP whether there is adverse traffic loading in the cells that is adversely affecting network performance, and automatically determining in the OMCP, suggested changes in cell sizes to correct the adverse traffic loading.

In still another aspect, the present invention is a method of configuring and testing a new hardware or software device in a self-engineering telecommunications network. The method begins by installing the new device in the network to correct a reported problem, detecting the new device by a network element, generating by the network element, an event indicating what type of device was installed and its predefined usage, and loading and configuring the device with predefined default parameters. This is followed by reporting to an operation and maintenance control point (OMCP) that the new device has been installed, collecting raw exchange data and traffic data by the network element, and sending the collected data to the OMCP. The OMCP then monitors the performance of the new device and the quality of service in the network, and determines whether the new device has failed. If it has failed, the OMCP performs fault analysis to determine why the new device failed, and reports a failure cause to a network management system (NMS) for corrective action. If the new device did not fail, the method continues by reporting to the NMS that the new device has been installed and is working properly, utilizing simulations by the NMS to predict effects on network performance of utilizing the properly working new device to process traffic in the network, and utilizing the new device in traffic processing.

This is followed by determining actual results of utilizing the new device in traffic processing, comparing the actual results with the predicted effects, and refining the simulations to increase the accuracy of the predicted effects.

In yet another aspect, the present invention is a method of analyzing a reported fault from a hardware or software device in a network element in a self-engineering telecommunications network. The method begins by collecting by the network element a fault event from raw exchange data and traffic data, determining in the network element whether the event is new or whether it has been previously discovered and reported, and sending the event to an operation and maintenance control point (OMCP) if the event is new. This is followed by determining in a performance monitoring function in the OMCP whether a predefined performance threshold has been crossed, passing information regarding the event to a trouble sniffer function in the OMCP, determining a root cause of the fault event in the trouble sniffer function, and determining in an action proposal agent in the OMCP, suggested corrective actions to correct the fault event. The OMCP then sends the suggested corrective actions to a network management system (NMS) where simulation programs are utilized to predict results of executing the suggested corrective actions. The method then determines whether the predicted results are acceptable, modifies the suggested corrective actions in the OMCP upon determining that the NMS's predicted results are unacceptable, and executes the suggested corrective actions upon determining that the NMS's predicted results are acceptable. This is followed by determining actual results of executing the suggested corrective actions, comparing the actual results with the predicted results, and refining the simulation programs to increase the accuracy of the predicted results.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

Figure 1:
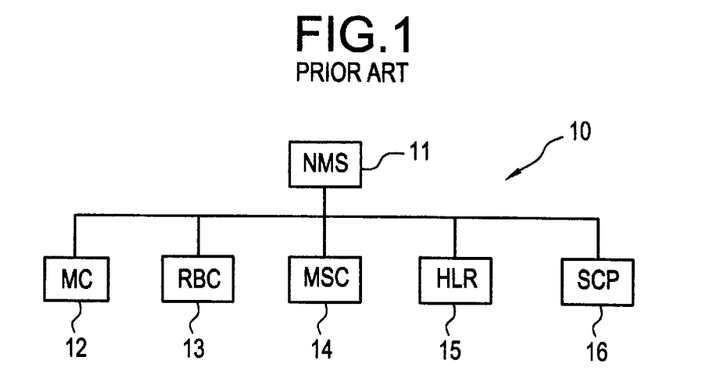
FIG. 1 (Prior Art) is a simplified block diagram of an existing telecommunications network and Network Management System (NMS)

FIG. 1 is a simplified block diagram of an existing telecommunications network 10 and a Network Management System (NMS) 11. A number of Network Elements (NEs) report symptoms and alarms to the NMS. The NMS is centralized, and has many reporting NEs. In FIG. 1, the telecommunications network 10 is a cellular radio telecommunications network, and the NEs include a Short Message Service Message Center (MC) 12, a Radio Base Station (RBS) 13, a Mobile Switching Center (MSC) 14, a Home Location Register (HLR) 15, and a Service Control Point (SCP) 16. In actual practice, many more NEs would be reporting to the NMS.

Figure 2:
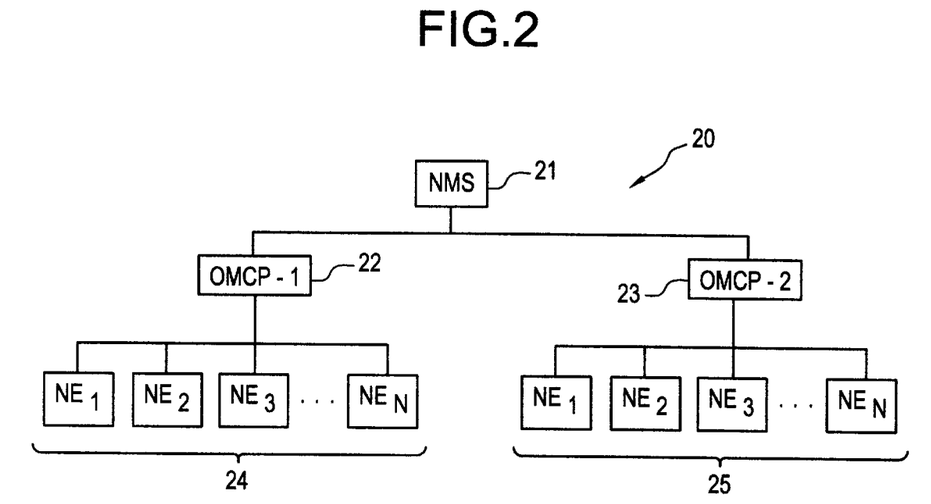
FIG. 2 is a simplified block diagram of a telecommunications network in which the Operation and Maintenance Control Point (OMCP) of the present invention has been implemented.

FIG. 2 is a simplified block diagram of a telecommunications network 20 in which the Operation and Maintenance Control Point (OMCP) of the present invention has been implemented. In the configuration of FIG. 2, a Network Management System (NMS) 21 is connected via an open interface to two OMCPs, OMCP-1 and OMCP-2 22 and 23. OMCP-1 is connected via high speed, reliable interfaces to a plurality of NEs (NE$_1$ through NE$_N$) 24. OMCP-2 is also connected via high speed, reliable interfaces to a plurality of NEs (NE$_1$ through NE$_N$) 25. Although two OMCPs have been illustrated, the invention is not limited to two, and a greater or lesser number may be utilized. The OMCP may be centralized or distributed, depending on the size of the network. In general, rather than just sending symptoms to the NMS 21, the OMCP sends suggested corrective actions. In the following figures, the operation of a single OMCP is described, although it should be recognized that several such OMCPs may be operating in a network and interfacing with the NMS in a similar manner.

Figure 3:
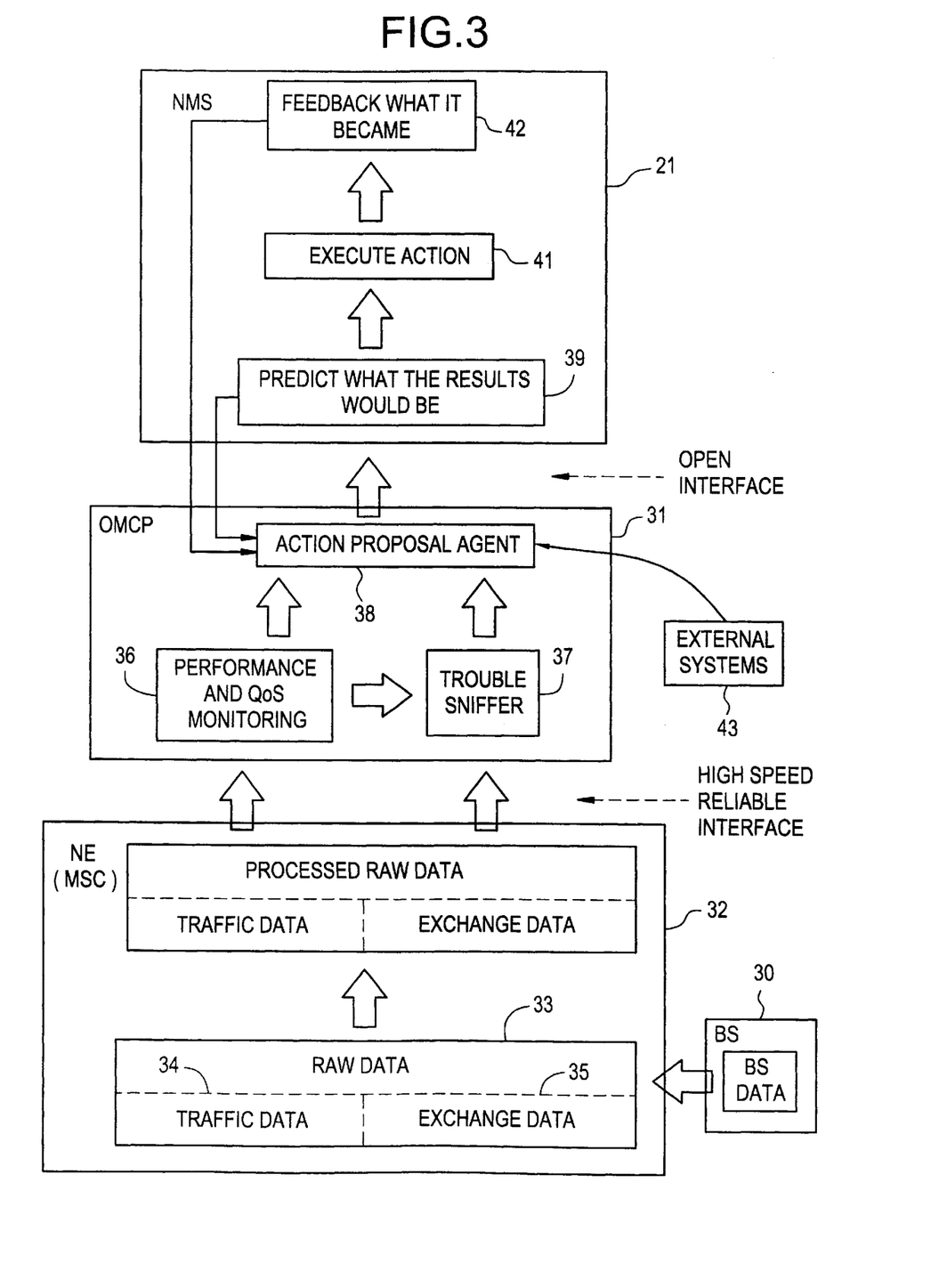
FIG. 3 is a simplified block diagram illustrating the flow of information in a self-engineering telecommunications network in which the OMCP of the present invention has been implemented.

FIG. 3 is a simplified block diagram illustrating the flow of information in a self-engineering telecommunications network in which the OMCP 31 of the present invention has been implemented. A self-engineering network is a network which automatically collects information about its performance, detects problems, analyzes the possible causes of the problems, determines suggested corrective actions, predicts the results of executing the actions, executes the actions, compares the actual results with the predicted results, and learns from the experience so that improved corrective actions are suggested the next time. The network includes the NMS 21, the OMCP 31, and a NE 32 (MSC). The NE has raw data 33 (for example, a card or a line in a base station 30 is defective) which needs to be reported to the NMS so that the network can be properly and efficiently managed. Raw data may come from traffic data 34 or exchange data 35, and may include, for example, exchange and cell configuration and performance data. In most NEs, approximately seven days of time-stamped data are stored.

The NE performs preprocessing to compress the data and sort it according to logical groups. Approximately 120 days of preprocessed data may be stored in order to enable accurate trend calculations to be performed. The preprocessed data is then sent to the OMCP 31 over the high speed interface.

Some of the preprocessed data enters the OMCP 31 through a Performance and Quality of Service (QoS) Monitoring (PQSM) function 36, and some of the data enters through a Trouble Sniffer (TS) 37. The OMCP uses the PQSM function to monitor performance and QoS in the network. Performance thresholds are defined (manually and/or automatically), and performance is presented to assess the current situation and current utilization level in the network. QoS may be monitored for specified cases such as handoffs and call setups.

The PQSM function 36 determines whether there is a problem with the QoS. If there is no degradation in the QoS exceeding any threshold, the data is passed directly from the PQSM function to an Action Proposal Agent (APA) 38. If there is QoS degradation, the PQSM function sends the data to the TS 37. The TS performs calculations to detect the cause of the degradation in the QoS. In addition to the input from the performance monitoring function, the TS considers the configuration of the system, all of the current performance measurements, trend calculations, and fault states. The OMCP interfaces with external systems 43 utilizing various transport networks such as PDH, SS7, etc. The external systems also provide input to the APA to assist in determining faults and corrective actions.

The suspected cause of the QoS degradation is then sent from the TS 37 to the APA 38. The APA analyzes the suspected cause of the problem, and determines suggested corrective actions which are then sent to the NMS 21. The suggested corrective actions may include, but are not limited to proposals for:

Link performance (e.g., more/fewer links needed);

Cell performance (e.g., change parameter settings, change frequencies);

Hardware performance (e.g., more hardware needed, efficiency of hardware utilization, hardware out of order);

System performance (e.g., more cells needed, load sharing efficiency);

Mobile station performance (considering specific MS types);

Remedy for a fault situation; and

Configuration changes in the network.

In a simulation block 39, the NMS may run multiple simulations to predict what the results would be if the suggested corrective actions are executed in the network. If the NMS's predictions are unacceptable, feedback is sent to the APA 38 which modifies its suggested corrective actions based on the feedback from the NMS. If the NMS's predictions are acceptable, the suggested corrective actions are then executed by an execution function 41, either manually or automatically. Areas suitable for automatic execution include frequency reallocations, temporary traffic load sharing, etc.

Following execution of the suggested actions, data is collected regarding the actual results of the actions in the network. A feedback function 42 in the NMS 21 then sends feedback to the APA 38 in the OMCP 31 regarding the actual results of executing the suggested corrective actions. The feedback includes trend analyses and a comparison of before and after results, both in the changed area and for total system performance.

If the results are not acceptable, the APA 38 may send additional suggested corrective actions to the NMS 21, utilizing the experience acquired from the results of the first actions. If the problem is corrected, then the OMCP passes NE reports directly to the NMS since no corrective action is required.

The above process is a continuous ongoing process. It should also be noted that while the first illustrated step (preprocessing of raw data) takes only a few seconds, the final steps involve more lengthy measurements and trend analysis of the data, and may take several hours or days to complete. Several examples of how the OMCP and the self-engineering system operate are described below.

Traffic Load Sharing

Figure 4:
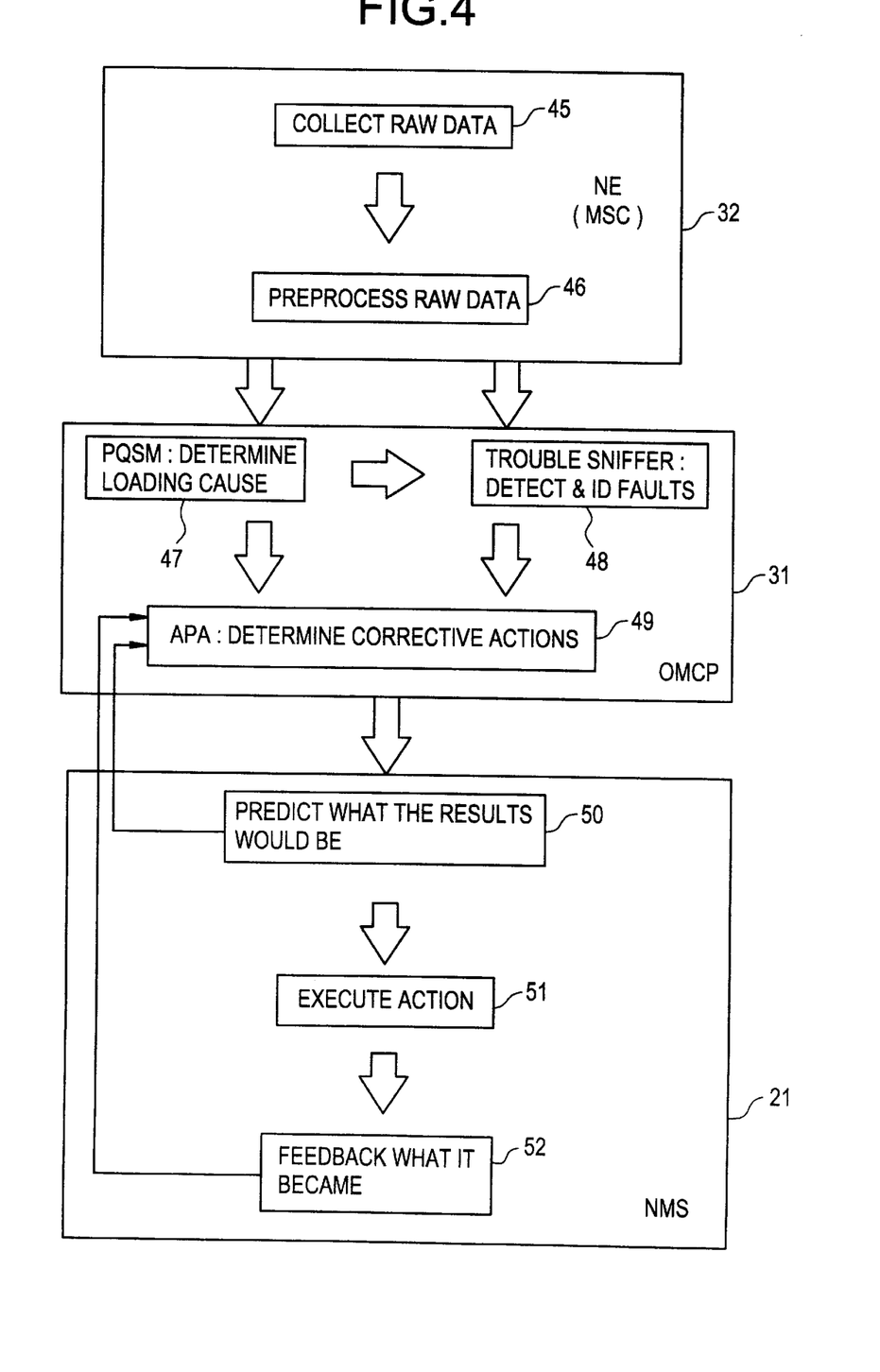
FIG. 4 is a flow chart illustrating the steps involved in a method of performing traffic load sharing in the self-engineering telecommunications network of FIG. 3.

FIG. 4 is a flow chart illustrating the steps involved in a method of performing traffic load sharing in the self-engineering telecommunications network of FIG. 3. At step 45, traffic measurements from all cells is collected as raw data by the NE 32. In a preprocessing step at 46, the data is compressed and sorted into logical groups to facilitate performance monitoring and analysis. The preprocessed data is then sent to the OMCP 31 over a high speed interface. Data related to system performance and quality of service is analyzed at 47 in the PQSM function 36. The PQSM function utilizes performance "gauges" such as voice channel utilization, paging load, and registration load in each cell to determine whether any adverse loading is due to excess paging, registrations, or other causes. At 48, the TS 37 analyzes the data to detect whether there is a fault, and to identify the fault if one is detected. The results of the analyses at steps 47 and 48 are sent to the APA 38 where possible corrective actions are determined at step 49. The possible corrective actions may include changing hysteresis values to temporarily change cell sizes and to shift the traffic load from heavily loaded cells to more lightly loaded cells, changing the capacity of various cells, or changing other cell parameters. The APA also analyzes long term trends to determine whether more capacity is needed in some cells.

The APA then suggests corrective actions to the NMS 21. At step 50, the NMS utilizes its simulation programs to predict what the results would be if the suggested corrective actions are executed. The simulations predict, for example, the resulting traffic in each cell, the impact on the interference level in the network, and the impact on mobile station signal strength level. If the NMS's predictions are unacceptable, feedback is sent to the APA 38 which modifies its suggested corrective actions based on the feedback from the NMS. If the NMS's predictions are acceptable, the suggested corrective actions are then executed either manually or automatically at step 51. The NMS then collects reports from the NEs and analyzes them to determine what the actual results of the corrective actions were. The actual results are fed back to the APA at step 52 to continuously improve the proposed actions.

As noted above, the self-engineering system may change cell sizes automatically in order to shift traffic load and eliminate problems in the network. This process includes automatically changing the hysteresis values affecting where handoffs and cell reselections occur, and automatically adjusting transmitter power in the base station to increase or decrease the cell size. In the past, this has been a manual task performed by the system operator based on operator experience.

Detection of New/Changed Hardware

Figure 5:
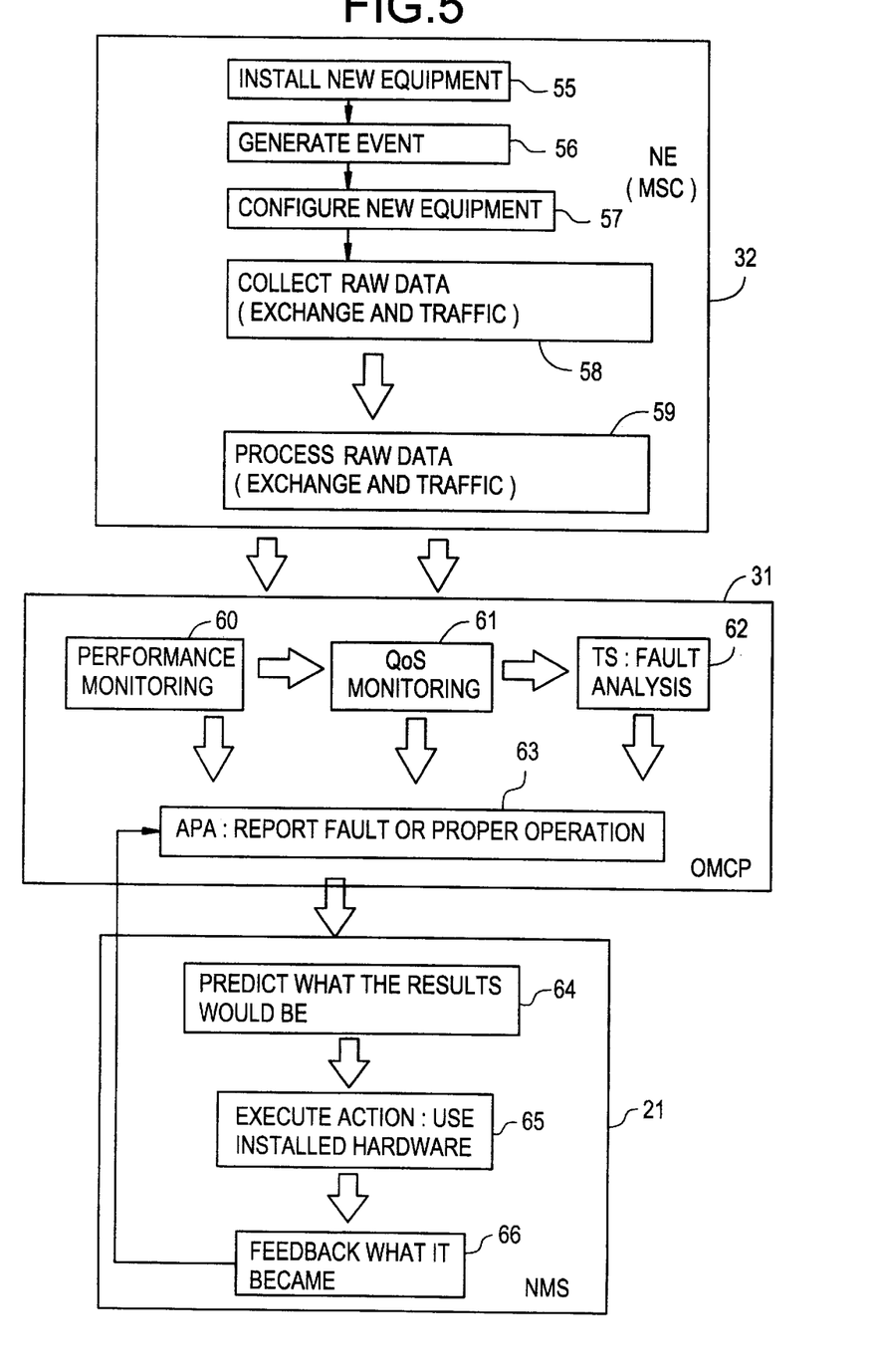
FIG. 5 is a flow chart illustrating the steps involved in a method of configuring and testing the installation of new or changed hardware in the self-engineering telecommunications network of FIG. 3.

FIG. 5 is a flow chart illustrating the steps involved in a method of configuring and testing the installation of new or changed hardware, such as a new piece of base station equipment, in the self-engineering telecommunications network of FIG. 3. When new base station equipment is installed in a cell site at 55, the new equipment is detected by the MSC 32. An event is generated at 56 indicating the type of hardware installed and its predefined usage, in this case hardware for a base station. Based on the hardware type and its predefined usage, the hardware is loaded and configured with predefined default parameters at 57. Knowledge that a new piece of equipment has been installed is then reported to the OMCP.

At step 58, the MSC 32 collects raw exchange data and traffic data, and then preprocesses the raw data at 59. The preprocessed data is then passed to the OMCP 31. The OMCP monitors the performance of the new equipment and the QoS in the network in accordance with predefined standards at steps 60 and 61, respectively. If the new equipment fails, the TS begins fault analysis at 62 to determine the cause of the failure. The cause is reported through the APA to the NMS 21 for corrective action at 63.

If the equipment is working properly, and the problem is corrected, the APA reports to the NMS at 63 that a new piece of equipment has been installed and is working properly. The NMS then predicts the results of a properly working piece of equipment at 64, and then uses the equipment in traffic processing at 65. The actual results are compared with the predicted results at 66, and the results are fed back to the APA. If the results are good, the NMS may then close down any open work order for the installation of the new piece of hardware.

Fault Analysis

Figure 6:
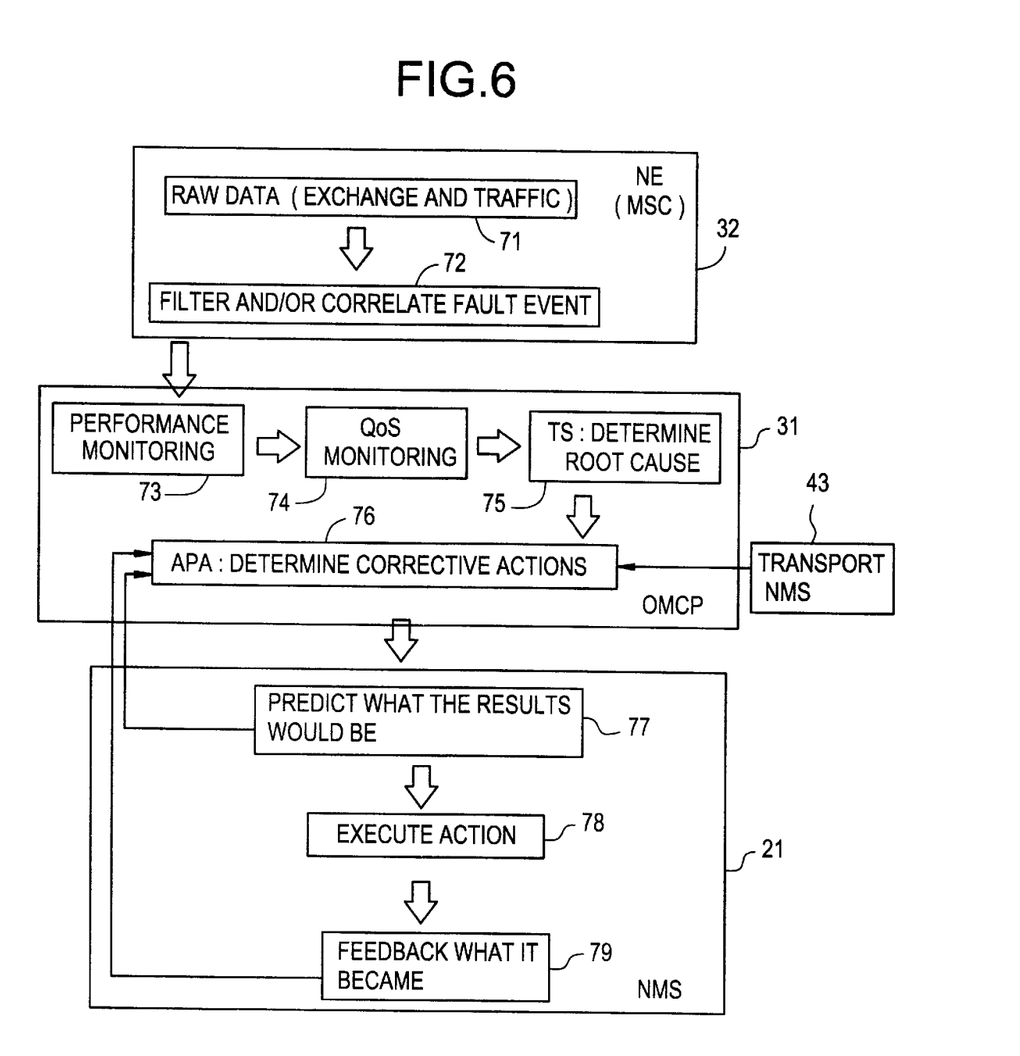
FIG. 6 is a flow chart illustrating the steps involved in a method of analyzing a reported fault in the self-engineering telecommunications network of FIG. 3.

FIG. 6 is a flow chart illustrating the steps involved in a method of analyzing a reported fault in the self-engineering telecommunications network of FIG. 3. At step 71, the raw exchange and traffic data collected by the NE 32 indicates a fault event (alarm) from a hardware or software device. At step 72, the event is filtered and/or correlated in the NE to determine whether it has been previously discovered and reported. If the event is new, the event is sent to the OMCP 31.

In the OMCP, performance monitoring may indicate a fault at step 73. The performance data is analyzed for quality of service at 74, and if a predefined threshold is crossed, an event may be generated indicating that levels of expected QoS have not been reached. The TS then analyzes the data at 75 and pin-points a root cause. The TS may be triggered to perform its analysis as a result of continuous monitoring, or as a result of a direct request by the APA. The root cause is then sent to the APA.

In the APA, inputs from external systems such as events from a transport network management system 43 are also utilized to analyze the root cause at 76. Different types of correlation algorithms are then applied to the existing set of events to determine suggested corrective actions. At step 77, the NMS utilizes its simulation programs to predict what the results would be if the suggested corrective actions are implemented. If the NMS's predictions are unacceptable, feedback is sent to the APA which modifies its suggested corrective actions based on the feedback from the NMS. If the NMS's predictions are acceptable, the suggested corrective actions are then executed either manually or automatically at step 78. The NMS then collects reports from the NEs and analyzes them to determine what the actual results of the corrective actions were. The actual results are fed back to the APA at step 79 to continuously improve the proposed corrective actions.

It is thus believed that the operation and construction of the present invention will be apparent from the foregoing description. While the system and method shown and described has been characterized as being preferred, it will be readily apparent that various changes and modifications could be made therein without departing from the spirit and scope of the invention as defined in the following claims.

What is claimed is:

1. An operation and maintenance control point (OMCP) in a telecommunications network having a plurality of network elements that report to the OMCP and a network management system (NMS) to which the OMCP reports, said OMCP comprising:
   a performance monitoring function that receives preprocessed traffic and exchange data from the network elements, monitors performance of the network elements and determines quality of service (QoS) in the network;
   a trouble sniffer that receives performance and QoS data from the performance monitoring function and detects faults within the network; and
   an action proposal agent comprising:
      means for receiving performance and QoS data from the performance monitoring function and fault data from the trouble sniffer;
      means for determining suggested corrective actions;
      means for providing suggested corrective actions to the NMS;
      means for receiving feedback from the NMS regarding the actual results of executing the suggested corrective actions; and
      means for utilizing the feedback to provide better suggestive corrective actions.

2. A self-engineering telecommunications network comprising:
   a plurality of network elements (NEs), each of said NEs including:
      means for collecting raw traffic data and exchange data; and
      means for preprocessing the raw data;
   an operation and maintenance control point (OMCP) that receives the preprocessed data from the NEs, said OMCP including:
      a performance monitoring function that monitors performance of the NEs and determines quality of service (QoS) in the network;
      a trouble sniffer that receives performance and QoS data from the performance monitoring function and detects faults within the network; and
      an action proposal agent that receives performance and QoS data from the performance monitoring finction and fault data from the trouble sniffer, and determines suggested corrective actions; and
   a network management system (NMS) that receives the suggested corrective actions from the OMCP, said NMS including:
      means for predicting results within the network of executing the suggested corrective actions;
      means for executing the suggested corrective actions;
      means for determining the actual results of executing the suggested corrective actions; and
      means for providing feedback to the action proposal agent regarding the actual results, said action proposal agent including means for utilizing the feedback to provide better suggested corrective actions.

3. The self-engineering telecommunications network of claim 2 wherein the means for preprocessing the raw data includes means for compressing the raw data and sorting the data into logical groups.

4. The self-engineering telecommunications network of claim 2 wherein the NMS also includes means for performing trend analyses regarding performance of the NEs and quality of service (QoS) in the network.

5. The self-engineering telecommunications network of claim 2 wherein the means for predicting results within the network of executing the suggested corrective actions also includes means for providing feedback to the action proposal agent if the predicted results are not satisfactory, and the action proposal agent includes means for revising the suggested corrective actions upon receiving feedback from the means for predicting results that the predicted results are unsatisfactory.

6. The self-engineering telecommunications network of claim 2 wherein the network is a cellular radio telecommunications network, and the suggested corrective actions include automatically changing cell sizes to improve network performance.

7. The self-engineering telecommunications network of claim 2 wherein the OMCP also includes means for interfacing with external systems to obtain network management information.

8. The self-engineering telecommunications network of claim 2 wherein:

one of the network elements is a mobile switching center (MSC) that collects traffic measurements from a plurality of cells in the MSC's service area and sends the measurements to the OMCP;

the OMCP determines that there is adverse traffic loading in the cells that is adversely affecting network performance; and the suggested corrective actions include changing cell sizes to correct the adverse traffic loading.

9. The self-engineering telecommunications network of claim 8 wherein the NMS simulates the resulting traffic in each cell resulting from changing the cell sizes to predict resulting signal strength levels and interference levels in the network.

10. A method of implementing a self-engineering telecommunications network comprising the steps of:

automatically collecting information about the network's performance;

automatically detecting problems with the network's performance utilizing the collected information;

automatically analyzing possible causes of the detected problems;

automatically determining suggested corrective actions to correct the causes;

automatically predicting results of executing the suggested actions;

automatically executing the actions;

automatically comparing actual results of executing the suggested actions with the predicted results; and automatically learning from the comparing step so that improved corrective actions are suggested when problems recur.

11. The method of implementing a self-engineering telecommunications network of claim 10 further comprising, before the step of automatically executing the actions, the steps of:

automatically determining from the predicted results, whether the suggested corrective actions will correct the problems; and automatically determining improved suggested corrective actions to correct the causes, upon determining that the suggested corrective actions will not correct the problems.

12. In a self-engineering telecommunications network, a method of configuring and testing a new hardware or software device, said method comprising the steps of:

installing the new device in the network to correct a reported problem;

detecting the new device by a network element;

generating, by the network element, an event indicating what type of device was installed and its predefined usage;

loading and configuring the device with predefined default parameters;

reporting to an operation and maintenance control point (OMCP) that the new device has been installed;

collecting raw exchange data and traffic data by the network element;

sending the collected data to the OMCP;

monitoring by the OMCP, performance of the new device and the quality of service in the network;

determining in the OMCP whether the new device fails;

performing fault analysis in the OMCP to determine why the new device failed, upon determining that it failed;

reporting a failure cause to a network management system (NMS) for corrective action;

reporting to the NMS that the new device has been installed and is working properly upon determining that the new device did not fail;

utilizing simulations by the NMS, to predict effects on network performance of utilizing the properly working new device to process traffic in the network;

utilizing the new device in traffic processing;

determining actual results of utilizing the new device in traffic processing;

comparing the actual results with the predicted effects; and refining the simulations to increase the accuracy of the predicted effects.

13. In a self-engineering telecommunications network, a method of analyzing a reported fault from a hardware or software device in a network element, said method comprising the steps of:

collecting by the network element, a fault event from raw exchange data and traffic data;

determining in the network element whether the event has been previously discovered and reported;

sending the event to an operation and maintenance control point (OMCP) if the event is new;

determining in a performance monitoring function in the OMCP, whether a predefined performance threshold has been crossed;

passing information regarding the event and the crossed threshold to a trouble sniffer function in the OMCP;

determining a root cause of the fault event in the trouble sniffer function;

determining in an action proposal agent in the OMCP, suggested corrective actions to correct the fault event;

sending the suggested corrective actions to a network management system (NMS);

utilizing simulation programs in the NMS to predict results of executing the suggested corrective actions;

determining whether the predicted results are acceptable;

modifying the suggested corrective actions in the OMCP upon determining that the NMS's predicted results are unacceptable;

executing the suggested corrective actions upon determining that the NMS's predicted results are acceptable;

determining actual results of executing the suggested corrective actions;

comparing the actual results with the predicted results; and sending feedback to the action proposal agent to enable the agent to improve the suggested corrective actions.

* * * * *